May 27, 1952 H. L. HORWITZ 2,597,869
IMPULSE REPEATER FOR METERED AUTOMATIC TELEPHONE SERVICE
Filed Nov. 30, 1946
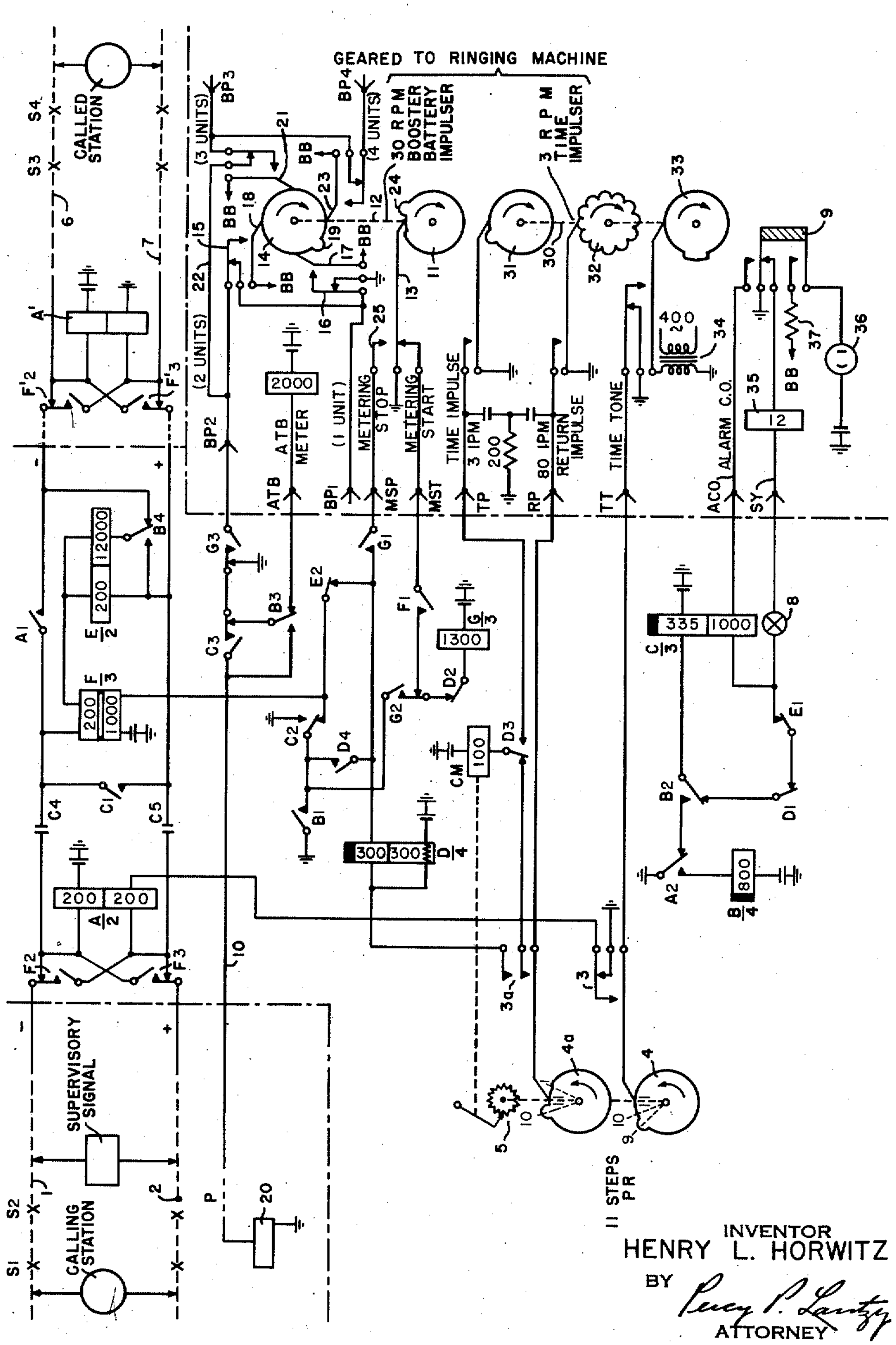
INVENTOR
HENRY L. HORWITZ
BY Percy P. Lantzy
ATTORNEY Patented May 27, 1952 2,597,869

UNITED STATES PATENT OFFICE 2,597,869

IMPULSE REPEATER FOR METERED AUTOMATIC TELEPHONE SERVICE

Henry L. Horwitz, Jamaica, N. Y., assignor to Federal Telephone and Radio Corporation, New York, N. Y., a corporation of Delaware Application November 30, 1946, Serial No. 713,352

24 Claims. (Cl. 179—7)

This invention relates to new and useful improvements in repeater circuits such as are used in automatic telephone exchange systems for repeating the dialing or keying impulses from one portion of the connection to another portion that is in the process of being built up towards the called line.

The object of the present invention is to provide a simple repeater circuit capable of controlling a large number of diverse functions in addition to the customary repeating of the impulses.

In carrying out this object the repeater circuit is equipped to hold the proceeding switches through which the calling line was extended to it in their operated position, as well as part of the called side of the connection.

According to another feature of the invention, when the called party answers the repeater reverses the battery connection towards the calling side of the connection in order to control supervisory signals. Furthermore, the repeater controls the transmission of one or more booster impulses to operate the meter of the calling party, depending on the zone of the called line.

Still another feature of the invention provides for the repeating of the metering impulses after the lapse of a predetermined time for the transmission of an acoustical signal to the talking parties a sufficient length of time before the termination of the metering impulses in order to permit them to terminate the conversation before a new charge is made. The metering pulses are supplied from a source common to a plurality of repeaters.

Another feature provides for the release of the repeater as well as of the switches employed in the calling side of the connection when the called party hangs up.

Still another feature provides for the busying of the repeater, and thus preventing its seizure by a calling line, when a trunk fault appears. The fault is indicated by the actuation of an individual supervisory lamp as well as of an alarm circuit common to a group of repeater circuits. When the trunk fault is eliminated the repeater again becomes normal and may be selected by a calling line. If the trunk fault appears during the building up of a connection, or during conversation then when the calling party restores his receiver, the repeater will cause the releasing of the switches in the calling portion of the connection.

More clearly to explain the nature of the invention, a preferred embodiment thereof will be described with the aid of the drawing which diagrammatically illustrates the pertinent elements of a telephone exchange system.

One of a plurality of repeaters is shown with some of their common equipment. Any one of a plurality of calling lines may be connected through the repeater with any one of a plurality of called lines located at a distant office. In the drawing a calling station is shown as connected with a called station through switching devices S1, S2 the calling end of the repeater, and the called end of the repeater extended over switching devices S3, S4. The switching devices are assumed to be automatic switches controlled by impulse senders at subscribers' stations. The number of switching stages on the calling and called sides may vary, the connection may be routed over manual operator's positions, and there may be many other well known variations of the system disclosed.

The calling side of the connection from the calling station to the repeater includes two talking conductors and a test conductor, and the called side from the repeater to the called office two talking conductors.

When the talking and test conductors leading to a repeater are seized, a circuit is closed from grounded battery over one winding of relay A, back contacts of relay F, talking conductor 1 the line loop over the calling station or an intermediate operator's position, and then back over talking conductor 2, a back contact controlled by relay armature F3, lower winding of relay A and normally closed contacts 3 of a cam 4 of switch 5 to ground. Relay A becomes energized and closes in its contact A1, the outgoing loop over the two wires 6, 7, leading from the repeater: conductor 6, relay contact A1, 200-ohm upper winding of relay F, 200-ohm left-hand winding of relay E, conductor 7. Contact A2 of the relay closes an obvious circuit for energizing a slow acting relay B which, in turn, opens the lead to the 335-ohm winding of relay C.

In contact B1 the relay B connects ground over the back contact of C2 to the 1000-ohm polarizing winding of the shunt field relay F, energizing it. Relay B prepares also an operating circuit in contact B2 for the relay C and in B1 for the relay D. The circuit of the relay D is open at this time in contact E2 because the relay E is held energized over the trunk line 6, 7.

In order to indicate faulty condition of the outgoing trunk 6, 7, the relay E of each repeater is always held energized, whether the repeater is in use or not. When the repeater is not in use, then the energizing circuit extends from negative battery supplied over the winding of the relay A' at the remote exchange, trunk conductor 6, B4 back, the two windings of relay E in series, trunk conductor 7, and the lower winding of relay A' to ground. When the repeater is seized and the relay B becomes energized and at B4 connects the two windings of E in parallel, then the energizing circuit may be traced over 6, the upper two hundred ohm winding of F, the left-hand two hundred ohm winding in parallel with the right-hand 12,000-ohm winding of E to conductor 7.

The relay F is a shunt field relay which does not operate at this time because the current flowing through its upper 200-ohm winding is not of the proper direction. This relay can operate only when the called subscriber answers and causes in the well-known manner the reversal of the battery feed to trunk conductors 6 and 7 by operating contacts F'2 and F'3 a relay F' not shown. Relay F' is operated by the called station.

Since relay E is permanently energized, a common alarm supervisory circuit including normal contacts of a key 9 cannot be closed through lamp 8 in the repeater over E1 back, D1 back, D2 back and the winding of C to ground battery. In order to guard against closure of this circuit when relay E becomes de-energized during dialing, the circuit is opened also in B2 back. Contact B3 connects ground from the back contact of G3 over a back contact of C3 to the test or release conductor 10 leading towards the calling line, and disconnects said ground from a meter ATB. This ground will hold all preceding switches such as S1, S2, etc.

The calling party will now send out dialing pulses which interrupt the line circuit 1, 2, causing corresponding operations of relay A in the repeater.

Upon the first release of relay A a circuit is completed for the low resistance operating winding of the relay C over the front contact of B2. Due to its slowness, relay B does not release during the impulsing, nor does relay C.

When the relay C becomes energized, its armature C3 disconnects release conductor 10 from the shunt path around B3 front and connects it directly to holding ground over G3 back.

Contact C2 will supply ground in parallel with B1 and, by opening its back contact, will prevent relay D from operating over the circuit that would otherwise be established upon the release of relay E which is short-circuited during impulsing through C1 front. This short circuit prepares a direct loop for forward dialing, shunting out relay E and causing its de-energization. The windings of E and F serve as an impedance bridge in the dialing loop.

Each pulse is repeated in the outgoing loop by relay armature A1 and causes corresponding operations of A1 to control the establishment of the connection to the called subscriber.

After dialing, relay A remains energized, relay C releases, restoring all the circuits to their previous condition with relay A, B and E energized. The talking circuit is established over conductors 1, 6 and 2, 7, F2 and F3 back, A1 front and condensers C4 and C5.

*Called party answers*

When the called station answers the call, the trunk line polarity is reversed in contacts F'2 and F'3 in the well-known manner so that the conductor 6 will be connected to the positive and conductor 7 to the negative pole of the battery over the windings of A'. This will operate the shunt field of relay F which, by attracting armatures F2, F3, reverses the polarity in the line circuit 1, 2 for controlling the supervisory signal, e. g. at an operator's position in the usual manner.

In contact F1, relay F connects relay G to a common metering start lead MST. A cam 11 provided on a shaft 12 of the booster battery impulser common to a plurality of repeaters rotates at thirty revolutions per minute. Through the agency of a spring 13 cam 11 applies a brief ground impulse to relay G which, in reply to the first impulse, will lock to ground at B1 over G2. The MST conductor is immediately disconnected from the relay in G2 back. In its contact G1, relay G connects the metering stop lead MSP to the winding of relay D, and in its contact G3 it disconnects direct ground from the release conductor 10 which, however, will remain grounded over one of the booster pulse leads BP under the control of cam 14 of the impulser 12 in the following manner:

In the position of the impulser 12 shown in the drawing, the conductor BP2 which is connected with armatures G3 of the G relays in all repeaters through which calls are routed to the same zone is grounded over the normal contact of spring 15, and the normal contact of spring 16, said springs forming parts of two groups of spring 17 and 18 which are successively operated by cam 14. As the cam rotates in the direction of the arrow, its nose 19 will first operate springs 17 connecting conductor BP2 over 15 and 16 the grounded booster battery BB. Immediately thereafter the ground connection in the normal contact of spring 16 is broken. After the nose 19 passes the spring group 17, the booster battery is disconnected from conductor 10 and ground is reconnected thereto in the normal contact of spring 16.

This operation is repeated when nose 19 of the cam engages spring group 18.

The number of booster battery impulses thus sent over the conductor 10 to the calling subscriber's meter 20 depends on the wiring of the BP leads of the repeater with the springs of impulser 12. If the G relay armature G3 of the repeater is connected to PB1, then one pulse, if with PB2, then two pulses, if with PB3, then three and if with BP4, then four pulses must be sent. The third group of springs 21 is connected over conductor 22 with the second group, so as to extend ground from the first group 17.

Before the nose 19 of the cam 14 reaches the first group of contacts 17, the control cam 11 of the booster battery impulser will have disconnected ground from the MST lead so as to keep the relays G of all the other repeaters multipled to this lead disconnected during the metering period. After this the impulse cam 14 actuates the four contact groups 17, 18, 21 and 23, but before the cam 11 again grounds lead MST, the nose 24 of cam 11 will push spring 13 into engagement with contact 25, momentarily grounding the metering stop lead MSP and completing the energizing circuit of relay D over G1.

Relay D locks over its front contact D4 to ground at B1. In contact D2 the relay disconnects relay G which becomes de-energized. Contact D1 has no function at this moment since the supervisory circuit SY is already open in contacts E1 and B2. Contact D3 controls the circuit of the magnet CM which controls the operation of the timing switch 5.

When the relay G becomes de-energized and opens contact G1, the MSP lead is disconnected from relay D. In G2 the holding circuit of relay G is opened and the MST lead is reconnected to the winding of the relay. However, the ground applied to MST by spring 13 cannot again operate the relay G, because its circuit is now open in D2. In contact G3 the release trunk 10 is disconnected form the BP lead and reconnected to direct ground.

*Called subscriber flashes the manual operator*

Should the called party desire to recall the manual operator, he depresses his switch-hook to de-energize relay F and then flash it. Contacts F2, F3 reverse the polarity of the conductor 1 and 2, causing the flashing of a supervisory lamp in front of the manual operator. Contact F1 has no function at this time since the circuit of relay G is interrupted in the resting contact of D2 or in the normal contact of G2.

*Repeating of metering impulses*

Each repeater is equipped with an eleven-step switch 5 having a control magnet CM. Assuming a three minute tariff, a time impulser common to all the repeaters and having a shaft 30 on which cams 31, 32, and 33 are mounted transmits after the called party answers, one impulse every 20 seconds over a common time impulse lead TP and D3 front to magnet CM. After ten impulses the cams 4 and 4*a* of switch 5 reach the last step before returning to the stand-by position shown in the drawing. Thus, nine times 20 seconds, i. e. 3 minutes, plus a maximum of 20 seconds, will have elapsed since the first ground was applied over TP.

As above stated the relay D operates after the first revolution of the impulser 12 following the answer by the called party and connects the winding of magnet CM to the TP lead, disconnecting it from the common return impulse lead RP to which in the normal position of relay D the magnet is connected under the control of cam 4*a* from the first to the tenth step of switch 5.

When the switch 5 has taken its ninth step, then the ground connected to the talking conductor 2 over a winding of relay A by contact 3 of cam 4 is interrupted and replaced by a ground applied over time tone conductor TT leading to the common time impulser 30. During each revolution of the cam 33 of the time impulser, the contacts controlled by this cam are operated for a period of about one second, replacing the direct ground applied to conductor TT by a grounded signal tone from source 34. This tone is, therefore, transmitted over the talking conductor 2, 7 to both of the calling and called parties engaged in the connection, indicating to them that a new unit charge is about to be made for the call unless the parties finish their conversation within twenty seconds.

When the switch 5 completes its tenth step, then the cam 4*a* will actuate its contacts 3*a* and close therethrough the circuit from the lead RP to one terminal of the winding of relay D, the other terminal of which is connected to ground over D4 front and B1 front. Thus, relay D will be short circuited when the next ground impulse is applied to lead RP by cam 32 which happens every second. Relay D becomes de-energized and closes a circuit from grounded battery over the winding of magnet CM, D3 back, the contacts 3*a* and the conductor RP to cam 32 which will send ground pulses to magnet CM to return the switch 5 to its normal or standby position. The circuit of CM is opened in the normal position by the cam 4*a*.

Contact D2 in releasing reconnects the relay G to the MST lead. If the subscribers are still talking the relay G will receive another starting impulse over conductor MST and the metering cycle is started again in the same manner as above described, the meter magnet 20 being again operated by two booster impulses.

This process is repeated as long as the subscribers are talking.

*Called subscriber hangs up*

When the called subscriber hangs up the relay F becomes de-energized, reversing the connection of the battery in the contacts F2, F3 to actuate the supervisory signal at the manual board.

Contact F1 disconnects the MST lead preventing the re-energization of G when cam 11 of impulser 12 returns to the home position.

*Calling subscriber hangs up*

When the calling subscriber opens the line circuit, the relay A releases, and after a short lapse of time relay B becomes de-energized. But before this can happen a momentary circuit is closed for relay C over B2 front and A2 back so that ground will be maintained on the test conductor 10 in C3 front after B3 front has opened to avoid premature reseizure of the repeater before the release of the switch train S3, S4 by which the repeater was connected to the called line at the distant exchange.

Contact B2 interrupts the circuit through the 335-ohm operating winding of relay C. Contact B4 of the relay opens the forward loop, releasing relay F if it has not yet been released by the calling subscriber, and reconnects the high resistance winding (12,000-ohms) of relay E in series with the low resistance winding (200-ohms) across the talking conductors 6, 7.

Thus relay E is maintained operated, but the line relay, such as A', at the distant exchange cannot remain energized over the high resistance of this bridge.

The opening of the front contacts B1 and C2 results in the removal of the holding ground from the winding of relay D which becomes de-energized and closes in D3 back the above described return circuit for the magnet CM of switch 5, which under the control of cam 32 returns to normal, whereupon cam 4*a* opens its circuit.

*Trunking faults during idle position*

While the repeater is in use, the relay E is operated over its high resistance right-hand winding from battery and ground at the line relay A1 bridged across the talking conductors 6 and 7 at the distant exchange. Relay A', as above stated does not operate except when the high resistance winding of E is shunted out in B4 front.

When a trunking fault occurs because trunk conductors are interrupted, grounded, or short circuited, then relay E becomes de-energized and completes in its back contact E1 an alarm supervisory circuit from battery, the low resistance operating winding of relay C, contact B2 back, contact D1 back, contact E1 back, a 24 volt alarm lamp 8, the common supervisory lead SY, supervisory relay 35, and the normally closed contacts of key 9 to ground. The alarm lamp 8 lights up at a voltage drop of about 24 volts in series with the operating winding of relay C which also operates. In contact C3, ground is applied to the release conductor 10 to prevent seizure of the repeater, and the ATB metering lead is disconnected in the now opened back contact of C3 to prevent the operation of meter magnet ATB.

*Trunk fault disappears*

When the trunk fault is removed the relay E becomes operated again and opens in its back contact E1 the alarm supervisory circuit whereupon relay C becomes de-energized and the lamp 8 is extinguished.

The repeater is now ready for further operation.

*Trunk fault during talking*

Should a fault occur while the calling and called parties are talking, the relay E which is operated over the talking bridge in series with relay F releases and prepares in its contact E1 the alarm supervisory circuit.

When the calling subscriber replaces his receiver, the relay A releases operating momentarily the relay C over A2 back and B2 front. After a brief interval relay B releases, disconnecting the holding ground over relay D at contact B. However, this relay will be held over C2 front. Contact B2 switches the operating winding of relay C from A2 to D1 which is still held attracted by D.

After a short interval relay C becomes de-energized and disconnects the holding ground applied over C3, releasing all preceding switches and the calling subscriber's cut-off relay. Contact C2 removes ground from the holding winding of relay D which after a short interval releases and completes in its contact D1 the supervisory alarm circuit to re-operate relay C.

The operation proceeds then in the same manner as if the fault occurred while the repeater is idle.

*Trunk fault occurs before called subscriber answers*

In this case relay D has not yet operated. When relay E releases on account of the trunk fault then a circuit is closed from grounded battery over the windings of relay D, contact E2 back, contact C2 back, contact B1 front, to ground to operate relay D.

When the calling subscriber replaces his receiver then relays A and B become de-energized and the operation proceeds as described when the trunk fault occurred during talking.

*Main alarm cut-off*

If the trunk fault cannot be corrected then the alarm may be cut off by operating the key 9 which is common to all the repeaters. This key removes the ground from the common supervisory relay 35 and the alarm lamp 8. The key will apply ground to the common alarm conductor ACO connecting the high resistance winding of relay C in series with its operating winding which will reduce the continuous current drain to a minimum.

A low drain neon lamp is connected from the booster battery BB over a very high resistance 37 and a contact of key 9 to function as a guard lamp. The key 9 does not interfere with the self-restoring circuit previously described should the fault be cleared.

What is claimed is:

1. In a repeater for an automatic telephone exchange system, incoming and outgoing trunk connections, a first and a second source of current, a first relay, control winding means for said relay connected to said first source of current and to said incoming trunk connection to bridge said first source of current across said incoming trunk connection, contact means operable by said first relay for establishing a communication path between said incoming and outgoing trunk connections, a second relay, control winding means for said second relay connected to said second source of current and to said outgoing trunk connection to bridge said first source of current across said outgoing trunk connection and means for indicating an abnormal condition in the outgoing trunk connection and circuits connected thereto comprising a control relay, control winding means for said control relay permanently connected across the outgoing trunk connection whereby said control relay is normally energized by said second current source, whether or not the repeater is in use and indicating means operatively associated with said control relay.

2. In a repeater for an automatic telephone exchange system, incoming and outgoing trunk connections, a first and a second source of current, a first relay, control winding means for said relay connected to said first source of current and to said incoming trunk connection to bridge said first source of current across said incoming trunk connection, contact means operable by said first relay for establishing a communication path between said incoming and outgoing trunk connections, a second relay, control winding means for said second relay connected to said second source of current and to said outgoing trunk connection to bridge said first source of current across said outgoing trunk connection and means for indicating an abnormal condition in the outgoing trunk connection and circuits connected thereto comprising a control relay, control winding means for said control relay permanently connected across the outgoing trunk connection whereby said control relay is normally energized by said second current source, indicating means operatively associated with said control relay, a second control relay, a control winding for said second control relay connected in circuit with the control winding means of said first named control relay and means operatively associated with said second control relay for performing a service function during the period said second control relay is in operated condition.

3. In a repeater according to claim 1 having an operative condition when said first relay is operated and said outgoing trunk connection is connected to an outgoing trunk and an inoperative condition when said first relay is deenergized and the outgoing trunk connection is free, and in which said winding means for said control relay comprises a first and a second winding, relay means controlled by said first relay, contact means operated by said relay means operative to connect said windings in series to said second source of current under one operating condition of the repeater and in parallel under the other operating condition to maintain said relay energized under both conditions.

4. In a repeater according to claim 1 and further comprising a second control relay having a shunt field winding in the circuit of said winding means of said first named control relay and a polarizing winding under the control of said first relay and means having a service function in said repeater being controlled by said energization of said second control relay.

5. In an automatic telephone exchange system a repeater having an incoming and a conductively separated outgoing end, two sources of current, a first relay over which one current source is bridged across the incoming end, said relay having a contact controlling said outgoing end, a second relay over which the other current source is bridged across the outgoing end, a control relay being energized by said current over said second relay bridge and having a high and a low resistance winding permanently bridged across the outgoing end, a slow acting relay controlled by the first relay having a back contact for connecting the two windings of the control relay in series, and a front contact for the slow relay for connecting said windings in parallel.

6. In a repeater according to claim 2, and in which the second control relay has a polarizing winding energized under the control of the first relay upon seizure of the repeater and which further comprises a shunt field winding connected in circuit with the control winding means of the first control relay whereby the effectiveness of said second relay is rendered independent of the direction of current flow through said shunt field winding.

7. In an automatic telephone exchange system a repeater having an incoming trunk connection and an outgoing trunk connection, a line relay connected with the incoming trunk and having a contact controlling the outgoing trunk, a meter control relay having a shunt field winding bridged across the outgoing trunk and a polarizing winding controlled by said line relay and means operable upon the completion of a connection between said incoming and outgoing trunks for actuating said meter control relay.

8. The system according to claim 7 and, in addition a continuously rotating time impulser adapted to be used in common by a plurality of repeaters, a normally inactive switch having a plurality of positions for each repeater and having an operating magnet, a circuit for actuating said magnet once during each revolution of the impulser to move the switch from one position to the next, said circuit being controlled by a relay, a circuit for said magnet jointly controlled by the last-mentioned relay and the impulser for restoring the switch to normal, a source of signals, a circuit for connecting the source of signals with a talking conductor jointly controlled by the impulser and the switch, and a circuit controlled by the switch for opening the restoring circuit of said magnet.

9. The system according to claim 7, and, in addition, a time impulser adapted to be used in common by a plurality of repeaters having a constantly rotating shaft, a first, a second and a third cam carried by the shaft, a normally inactive switch having a plurality of positions for each repeater and having an operating magnet, a circuit for actuating said magnet once during each revolution of the shaft to move the switch from one position to the next, said circuit being jointly controlled by the first cam and a relay, a circuit for said magnet jointly controlled by said relay and the second cam in all positions of the switch except the normal for restoring the switch to normal, a source of signals, a circuit for connecting the source of signals with a talking conductor including contacts briefly closed by the third cam during each revolution, and contacts closed by the switch in its penultimate position only, and a circuit closed in the last position of the switch opening the restoring circuit of said magnet.

10. The system according to claim 7, and in addition, a time impulser adapted to be used in common by a plurality of repeaters divided into traffic zones, a contantly rotating shaft for the time impulser, a first, a second and a third cam carried by the shaft, a booster battery impulser continuously rotating with respect to a normal position common to the repeaters and adapted to send therethrough a number of impulses depending on the zone to which the repeater belongs, a normally inactive switch having a plurality of positions for each repeater and having an operating magnet, a third and a fourth relay in each repeater, the third relay having a circuit momentarily closed in the normal position of the booster battery impulser over a front contact of the meter control and a back contact of the fourth relay, a circuit for the fourth relay momentarily closed during the rotation of the booster battery impulser just before it returns to the normal position, a circuit for actuating said magnet once during each revolution of the shaft to move the switch from one position to the next, said circuit including the first cam and a front contact of the fourth relay, a circuit for said magnet including a back contact of the fourth relay and the second cam closed in all positions of the switch except the normal for restoring the switch to normal, a source of signals, a circuit for connecting the source of signals with a talking conductor including contacts briefly closed by the third cam during each revolution and contacts closed by the switch in its penultimate position only, and a circuit closed in the last position of the switch for de-energizing the fourth relay.

11. The system according to claim 7, and, in addition, a booster battery, a metering circuit including a conductor of the incoming trunk connection, means for applying operating impulses to the metering circuit including an impulser adapted to be used in common by a plurality of repeaters, said impulser having a shaft continuously rotating with respect to a normal position and carrying a first and a second cam, a plurality of sets of contacts arranged successively to be operated by the first cam during each revolution, each set having normally open contacts adapted to connect the booster battery to the metering circuit and normally closed contacts adapted to ground the metering circuit, a third and a fourth relay in each repeater, a circuit for the third relay including contacts of the fourth and the meter control relays and contacts closed only in the normal position by the second cam, a locking circuit for the third relay controlled by a contact of the fourth relay and a contact in the metering circuit controlled by the line relay and the third relay for connecting said metering circuit to one of said plurality of contacts controlled by said first cam and the line relay is energized.

12. In a repeater for automatic telephone exchange system in which a time impulser is used in common by a plurality of repeaters, an incoming trunk connection and an outgoing trunk connection, a line relay connected with the incoming trunk and having a contact controlling the outgoing trunk, first and second slow acting relays in each repeater, an operating circuit for the slow relays controlled by the line relay, a meter control relay having a low resistance shunt field winding bridged across the outgoing trunk talking conductors, a high resistance polarizing winding for the meter control relay controlled by by said slow relays, contacts controlled by the second slow relay for shunting out the low resistance winding of the meter control relay, a source of current connected in one direction across the outgoing trunk conductors, means operable upon the completion of a connection for operating the meter control relay only when the connection to the source of current is reversed and the polarizing winding is energized, and means for connecting said repeater to said time impulser for timing the connection.

13. In a repeater for automatic telephone exchange system in which a time impulser is used in common by a plurality of repeaters, an incoming trunk connection and an outgoing trunk connection, a line relay connected with the incoming trunk and having a contact controlling the outgoing trunk, first and second slow acting relays in each repeater, an operating circuit for the slow relays controlled by the line relay, a meter control relay having a low resistance shunt field winding bridged across the outgoing trunk talking conductors, a high resistance polarizing winding for the meter control relay controlled by said slow relays, contacts controlled by the second slow relay for shunting out the low resistance winding of the meter control relay, a source of current connected in one direction across the outgoing trunk conductors, means operable upon the completion of a connection for operating the meter control relay only when the connection to the source of current is reversed and the polarizing winding is energized, and means for connecting said repeater to said time impulser for timing the connection, the time impluser comprises a constantly rotating shaft and a first, a second and a third cam carried by the shaft, a normally inactive switch in each repeater having a plurality of positions and having an operating magnet, a relay operable when the called party answers, a circuit for actuating said magnet once during each revolution of the shaft to move the switch from one position to the next, said circuit including the first cam and a front contact of the last-mentioned relay, a circuit for said magnet including a back contact of the last-mentioned relay and the second cam closed in all positions of the switch except the normal for restoring the switch to normal, a source of signals, a circuit for connecting the source of signals with a talking conductor including contacts briefly closed by the switch in its penultimate position only, and a circuit closed in the last position of the switch for de-energizing the last-mentioned relay.

14. In a repeater for automatic telephone exchange system in which a time impulser is used in common by a plurality of repeaters, an incoming trunk connection and an outgoing trunk connection, a line relay connected with the incoming trunk and having a contact controlling the outgoing trunk, first and second slow acting relays in each repeater, an operating circuit for the slow relays controlled by the line relay, a meter control relay having a low resistance shunt field winding bridged across the outgoing trunk talking conductors, a high resistance polarizing winding for the meter control relay controlled by said slow relays, contacts controlled by the second slow relay for shunting out the low resistance winding of the meter control relay, a source of current connected in one direction across the outgoing trunk conductors, means operable upon the completion of a connection for operating the meter control relay only when the connection to the source of current is reversed and the polarizing winding is energized, an alarm control relay, a booster battery, a metering circuit including the third conductor of the incoming trunk, means for applying operating impulses to the metering circuit including an impulse adapted to be used in common by a plurality of repeaters, said impulser having a shaft continuously rotating with respect to normal position and carrying a first and a second cam, a plurality of sets of contacts arranged successively to be operated by the first cam during each revolution, each set having normally open contacts adapted to connect the booster battery to the metering circuit and normally closed contacts adapted to ground the metering circuit, a fifth and a sixth relay in each repeater, a circuit for the fifth relay including contacts of the sixth and the meter control relays and contacts closed only in the normal position by the second cam, a locking circuit for the fifth relay controlled by a contact of the sixth relay and in parallel contacts of the first and second slow relays, contacts controlled by the slow relays and the fifth relay in the metering circuit, a circuit for the sixth relay closed by the fifth relay and by the contacts of the second cam in all off-normal positions, and a parallel path for energizing the sixth relay when the alarm control relay and second slow relays are de-energized and the first slow relay is energized.

15. In an automatic telephone exchange system, a repeater having an incoming trunk connection and an outgoing trunk connection, a line relay connected with the incoming trunk and having a contact controlling the outgoing trunk, a source of current, means normally connecting said source with the outgoing trunk in one direction and upon the establishment of the connection in the opposite direction, an alarm relay connected with the outgoing trunk conductors and operated by current from said source irrespective of its direction, an alarm circuit common to said repeaters and including a contact of the alarm relays, a slow acting relay in each repeater, an operating circuit for the slow relay controlled by the line relay, a meter control relay connected with the outgoing trunk and operable only when the source is connected in said opposite direction, and means controlled by the slow relay for disabling the meter and the alarm control relays.

16. In an automatic telephone exchange system, a calling and a called exchange, a repeater having an incoming trunk connection with the calling exchange and an outgoing trunk connection with the called exchange, a line relay in each repeater connected with the incoming trunk and having a contact in the outgoing trunk, a source of current at the called exchange, means at the called exchange normally connecting said source with the outgoing trunk in one direction and upon the establishment of the connection in the opposite direction, an alarm control relay in the repeater connected with the outgoing trunk and operated by current from said source irrespective of its direction, an alarm circuit common to said repeaters and including a contact of the alarm relays, a first and a second slow acting relay in the repeater, the first having a contact and the second a winding in the alarm circuit, an operating circuit for the first slow relay controlled by the line relay, an operating circuit for the second slow relay jointly controlled by the line and first slow relays, a meter control relay connected with the outgoing trunk and operable only when the source is connected in said opposite direction, and means controlled by the second slow relay for disabling the meter and the alarm control relays.

17. In an automatic telephone exchange system, a calling and a called exchange, a repeater having a three conductor incoming trunk connection with the calling exchange and a two conductor outgoing trunk connection with the called exchange, a line relay in each repeater bridged across two talking conductors of the incoming trunk and having a contact in the outgoing trunk, a source of current at the called exchange, means at the called exchange normally connecting said source with the outgoing trunk conductors in one direction and upon the establishment of the connection in the opposite direction, an alarm control relay in the repeater bridged across the outgoing trunk conductors and operated by current from said source irrespective of its direction, an alarm circuit common to a plurality of said repeaters and including a contact of the alarm relay, a first and a second slow acting relay in each repeater, the first having a contact and the second a winding for connection to the alarm circuit, an operating circuit for the first slow relay controlled by the line relay, an operating circuit for the second slow relay jointly controlled by the line and the first slow relay, a meter control relay bridged across the outgoing conductors in series with the alarm relay and operable only when the source is connected in said opposite direction, and a bridge across the outgoing trunk conductors shunting the meter and the alarm control relays and controlled by the second slow relay.

18. In an automatic telephone exchange system, a repeater having an incoming trunk connection and an outgoing trunk connection, a line relay in each repeater connected with the incoming trunk and having a contact controlling the outgoing trunk, a first slow acting relay in the repeater, an operating circuit for the first slow relay controlled by the line relay, an alarm control relay having two windings bridged across the outgoing trunk, in series or in parallel, depending on the energized or de-energized condition of the first slow relay, a source of current connected with the outgoing trunk, contacts controlled by the slow relay for shunting out the alarm control relay, a second slow acting relay in the repeater operated only when the calling party dials, an alarm circuit common to a plurality of said repeaters and including contacts of the alarm control relay and the winding of the second slow relay, a busying circuit for the incoming trunk controlled by the second slow relay, and an energizing circuit for the second slow relay controlled in contacts of the first slow and alarm control relays.

19. In an automatic telephone exchange system, a repeater having an incoming trunk connection and an outgoing trunk connection, a line relay connected with the incoming trunk and having a contact controlling the outgoing trunk, a first and a second slow acting relay, an operating circuit for the first slow relay controlled by the line relay, an operating circuit for the second slow relay jointly controlled by the line and first slow relays, an alarm control relay having a high and a low resistance winding connected in series over an armature and back contact of the first slow relay across the outgoing trunk, said armature of the first slow relay having a front contact over which the two windings are connected in parallel, a source of current connected with the outgoing trunk, contacts controlled by the second slow relay for shunting out the alarm control relay, a fourth relay in the repeater operated only when the called party answers, an alarm circuit common to a plurality of said repeaters and including back contacts of the alarm control and of the fourth relays and the winding of the second slow relay, a busying circuit for the incoming trunk controlled by the second slow relay, a locking circuit for the fourth relay controlled by front contacts of the two slow relays in parallel, and an energizing circuit of the fourth relay controlled by the front contact of the first slow relay, a back contact of the second slow relay and a back contact of the alarm control relay.

20. In an automatic telephone exchange system, a repeater having an incoming trunk connection and outgoing trunk connection, a line relay connected with the incoming trunk and having a contact controlling the outgoing trunk, a first and a second slow acting relay, an operating circuit for the first slow relay controlled by the line relay, an operating circuit for the second slow relay jointly controlled by the line and first slow relays, an alarm control relay having a high and a low resistance winding connected in series over an armature and back contact of the first slow relay across the outgoing trunk, said armature having a front contact over which the two windings are connected in parallel, a source of current connected with the outgoing trunk, contacts controlled by the second slow relay for shunting out the alarm control relay, a meter control and a fifth relay in the repeater operated only when the called party answers, an alarm circuit common to a plurality of said repeaters and including back contacts of the alarm control of the fifth relays and the winding of the second slow relay, a busying circuit for the incoming trunk controlled by the meter control and the second slow relay, a locking circuit for the fifth relay controlled by front contacts of the two slow relays by parallel, and an energizing circuit of the fifth relay controlled in the front contact of the first slow relay, a back contact of the second slow relay and a back contact of the alarm control relay.

21. In a telephone exchange system, a plurality of lines, normally inactive switches and a repeater, means for operating said switches to connect a calling line with a called line over the repeater, means in the repeater controlled over the talking conductors for holding the switches operated which connect the repeater towards the calling and the called lines, a meter for the calling line, a source of metering current associated with the repeater, means for busying the repeater when a fault occurs in the conductors leading towards the called line, an alarm circuit controlled by the last-mentioned means, means controlled by the calling line for releasing the repeater irrespective of the operation of the last-mentioned means for busying, and means operable thereupon for releasing the switches connecting the calling line with the repeater.

22. The system according to claim 21, and in which the lines are divided into zones, means variably operable depending on the zone to which the called line belongs for connecting the metering current source to the meter of the calling line a certain number of times, means in the repeater and operable after a predetermined lapse of time for sending an acoustic signal to the parties, and means operable after a predetermined longer lapse of time for re-operating the means connecting the metering source, means controlled by the calling line for releasing the repeater.

23. The system according to claim 21, and in which a time impulser adapted to be used in common by a plurality of repeaters comprising a constantly rotating shaft, a first, a second and a third cam carried by the shaft, a normally inactive switch for each repeater having a plurality of positions and an operating magnet, a relay operable when the called party answers, a circuit for actuating said magnet once during each revolution of the shaft to move the switch from one position to the next, said circuit including the first cam and a front contact of the last-mentioned relay, a circuit for said magnet including a back contact of the last-mentioned relay and the second cam closed in all positions of the switch except the normal for restoring the switch to normal, a source of signals, a circuit for connecting the source of signals with a talking conductor including contacts briefly closed by the third cam during each revolution, and contacts closed by the switch in its penultimate position only, and a circuit closed in the last position of the switch for de-energizing the last-mentioned relay.

24. In a multi-exchange telephone system a plurality of lines at least some of which are provided with calling devices, said lines being divided into zones and having talking and test conductors, a repeater adapted to be used in one of the zones and having three conductor calling and two conductor called sides, calling switches for connecting the calling line with the repeater over the talking and test conductors, means in the repeater for holding over said test conductor the calling switches operated, means including a source of current and a line relay bridged across the talking conductors of the calling side of the selected repeater for repeating the impulses sent from the calling line in the called side, means including called switches operable by the repeated impulses to connect the called side of the repeater with the called line, an impedance bridge in the repeater across the conductors of the called side for holding the called switches operated, means controlled by the called line for reversing the direction of the current supply to the impedance bridge, means in the repeater responsive to answer by the called line for reversing the direction of current flow in the relay bridge of the calling side, a meter connected with the test conductor of the calling line, a source of metering current, means variably operable depending on the zone to which the repeater belongs for connecting the metering current source to the test conductor of the calling line a certain number of times, means in the repeater and operable after a predetermined lapse of time for sending an acoustic signal to the parties over the talking conductors, means operable after a predetermined longer lapse of time for re-operating the means connecting the metering source, means controlled by the calling line for releasing the repeater, means operable thereupon for releasing the calling switches, means for busying a repeater when a fault occurs in the conductors of the called side, an alarm circuit controlled by the last-mentioned means, means for restoring to normal a repeater when the fault is cleared, means controlled by the repeater for permitting the calling line to clear the calling switches if the fault in the called side occurs during seizure of the repeater conversation, and a signal operated when all repeaters belonging to a zone are busy.

HENRY L. HORWITZ.

REFERENCES CITED

The following references are of record in the file of this patent:

UNITED STATES PATENTS

| Number | Name | Date |
|---|---|---|
| 1,726,759 | Ostline | Sept. 3, 1929 |
| 1,831,400 | Stokely | Nov. 10, 1931 |
| 1,859,404 | McDavitt | May 24, 1932 |
| 1,917,403 | Stich | July 11, 1933 |
| 2,207,537 | Ellis et al. | July 9, 1940 |
| 2,214,256 | Peterson | Sept. 10, 1940 |
| 2,218,659 | Saville | Oct. 22, 1940 |